INVENTOR.
FRANCIS S. DENNEEN
BY Alfred C. Body
ATTORNEY

Patented July 22, 1952

2,604,569

UNITED STATES PATENT OFFICE 2,604,569

METHOD AND MEANS FOR BUTT WELDING

Francis S. Denneen, Cleveland, Ohio, assignor to The Ohio Crankshaft Company, Cleveland, Ohio, a corporation of Ohio Application February 28, 1950, Serial No. 146,829

5 Claims. (Cl. 219—10)

This invention pertains to the art of butt welding and, more particularly, to improved method and means for preparing the surfaces to be welded and for heating same.

In my copending application Serial No. 146,828 filed February 28, 1950, there is described a method and means for heating the surfaces of large metallic members and butt welding them. In that application, the surfaces to be welded are placed either in engagement or in slightly-spaced relationship and a high-frequency inductor is positioned around the edges thereof. This inductor induces high-frequency currents around the outer edges of the surfaces to be welded to heat these surfaces to the welding temperature. Heat flows inwardly from the outer edge by conduction. With large-sized members, difficulty was experienced in heating the central portions of the surfaces to the desired welding temperature. That application described a method of flowing direct or low-frequency alternating currents longitudinally of the members whereby to effect a resistance-type heating interiorly of the members and at the surfaces.

In the copending application of Alfred C. Body, Serial No. 146,887 filed February 28, 1950, it is proposed to position the surfaces in slightly-spaced relationship and provide an electrical connection centrally thereof. High-frequency currents are passed longitudinally along the outer surfaces of the members and thence radially over the surfaces themselves to provide a surface heating entirely over the surfaces to be heated.

The present invention pertains to method and means for obtaining increased strength welds using, in part, methods and means described in the above referred to applications. In those applications, the area of the final welded surface generally did not exceed the maximum cross-sectional area of the members themselves. As difficulty is experienced in always effecting 100 per cent perfect welds, failure of the welded members generally occurred at or near the welded section.

In view of the above, an object of the present invention is to effect a weld wherein the total area of the welded surface is substantially greater than the minimum cross-sectional area of the members.

Another object is to effect a weld wherein the welded surfaces extend over a substantial longitudinal length of the members being welded.

A further object is to effect a welded surface having a total area greater than the minimum area of the members and extending over a substantial length of the members.

Still another object is the provision of an improved weld wherein stresses from any direction imposed on the welded surface may always be resisted by welded surfaces disposed at a plurality of angles relative to the stresses and particularly tension stresses.

Still another object of the invention is the provision of new and improved methods for butt welding surfaces wherein the surfaces have corresponding depressions and projections which mate on a limited area and subsequently flow plasticly to fill any voids of the limited mating.

Another object is to allow for any trapped gases to escape.

Other and more specific objectives will become apparent upon a reading and understanding of this application.

The invention is comprised in certain manners of forming the surfaces prior to welding, in heating them and in bringing them into welding engagement, preferred embodiments of which are described in this specification and illustrated in the attached drawing which is a part hereof, and wherein.

Figure 1:
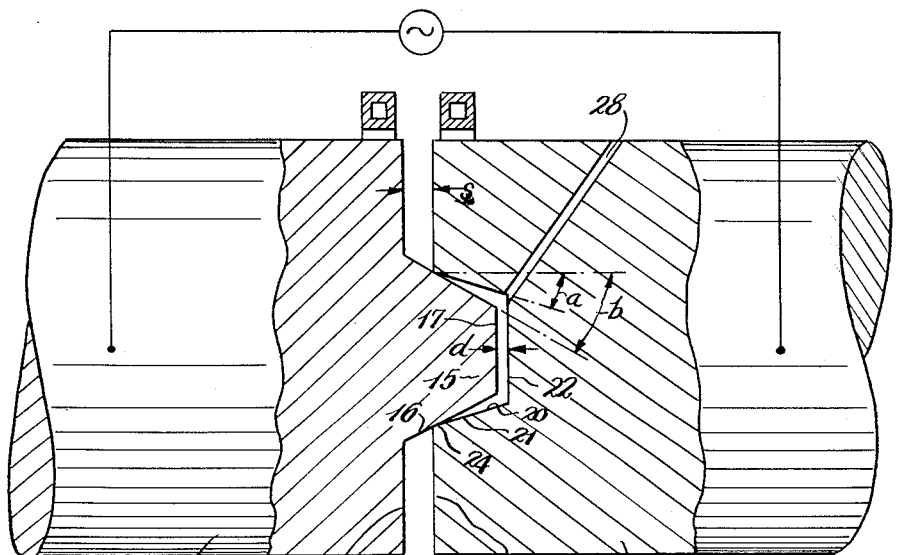
Figure 1 is a cross-sectional view of a pair of members embodying the present invention in position to be welded. The clearances in the angles shown are somewhat exaggerated for the purposes of clarity.

Referring now to the drawings wherein preferred embodiments of the invention are shown for the purposes of illustration only and not for the purposes of limitation, Figure 1 shows a pair of metallic members 10, 11 generally cylindrical in shape, and positioned in opposed axial alignment preparatory to being welded together. The member 10 has a surface 12 and the member 11 has a surface 13, each extending generally transversely of the members, which surfaces are to be heated to the welding temperature and placed in pressure engagement to complete the weld.

In the embodiment of the invention shown, the surface 12 has a projection or boss positioned generally centrally thereof and extending outwardly from the plane of the surface 12 a predetermined distance. As shown, this projection 15 is generally in the shape of the frustum of a cone having tapered side walls 16 and an end surface 17. The surfaces 16 taper outwardly from the surface 12 toward the axis at a predetermined angle $b$.

The surface 13 has an aperture or a recess 20 also generally in the shape of a frustum of a cone formed on an axis corresponding to the axis of the projection 15. The recess 20 has tapered side walls 21 and a generally flat base or bottom 22 which, when the members 10, 11 are positioned as shown in Figure 1, is preferably parallel to the end 17 of the boss or projection 15.

The side walls 21 taper inwardly away from the surface 13 toward the axis of the member 11 at an angle relative to the axis of the member indicated as angle $a$. It is to be noted that the angle $a$ is less than the angle $b$ for reasons which will hereinafter appear.

The maximum diameter of the aperture 20 is in the plane of the surface 13 and this maximum diameter is preferably slightly less than the maximum diameter of the projection 15, which maximum diameter is in the plane of the surface 12. Thus, when the surfaces 12, 13 are brought into opposed relationship for the purposes of heating them to the welding temperature, the corner 24 formed by the intersection of the surface 13 and the side wall 21 engages the sides of the projection 15 intermediate the ends of the projection. Thus, the surfaces 12, 13 are rigidly and initially spaced by a distance which may be indicated by S.

To heat the surfaces 12, 13 to the welding temperature, a high-frequency inductor may be positioned around the members 10, 11 in the vicinity of the surfaces 12, 13 in a manner as described in my above referred to application, or high-frequency currents, as described in the copending application of Alfred C. Body referred to above, may be circulated longitudinally of the members 10, 11. In either event, a heating will take place internally in the members 10, 11 and, particularly, at the point where the corner 24 engages the surface 16 of the boss 15. As the area of contact at this point is relatively limited, an electrical resistance heating will occur at this point which will provide an interior source of heat in the members 10, 11 and will provide a rapid heating action. As the members become heated interiorly, it will be appreciated that the metal of the corner 24 will become plastic due to the high temperatures which it will attain. At this time, the surfaces 12, 13 will be moved toward each other, the corner 24 deforming on the side of the projection 15 a sufficient amount to allow this movement. As the members 10, 11 become hotter and hotter, eventually the surfaces 12, 13 will move into abutting engagement and further pressure on the members will cause these surfaces to be welded. If desired, heat from a high-frequency inductor 26 connected to a suitable power source 27 may also be applied.

It will be appreciated that because of the differences in the angles of the sides 16 of the projection 15 and the sides 21 of the aperture 20, a void exists on the interior of the members even after the welding is completed, unless some means is provided to cause the projection to flow radially outwardly to fill this void. In the preferred embodiment of the invention, the axial length of the projection 15 is preferably such that when the members 10, 11 are first positioned as shown in Figure 1, the distance D between the base 22 and the end 17 will be less than the distance S. Thus, as the members 10, 11 are moved toward each other, the end 17 will engage the base 22 prior to the engagement of the surfaces 12, 13. Then, on subsequent movement of the members 10, 11 toward each other, the boss 15 which is also heated to a plastic state will flow radially outwardly to fill in this void. The exact dimensions as to the length of the boss 15 in relation to the depth of the aperture 20 will vary. It is preferred that the length be chosen such that the void will be completely filled. When the end 17 engages the base 22, electric current, if a direct or low-frequency alternative current source is used, will also flow through the base, thus heating this surface to a relatively high temperature and making it more plastic so that the void may readily be filled in.

In the embodiment of the invention shown, when the boss 15 is positioned in the aperture 20 as shown, a sealed air pocket therein will exist. A small air passage 28 extending preferably from a corner of the aperture 20 to the exterior surface of the member 11 vents this pocket.

Obviously, the invention may take other forms than that illustrated in the preferred embodiment. For example, the boss 15 and aperture 20 may have any other cross-sectional shape. A plurality of bosses 12 and apertures 20 may be provided and they may be alternated between the surfaces. Also, the projection and recess may have curved or generally spherical contours.

Figure 2:
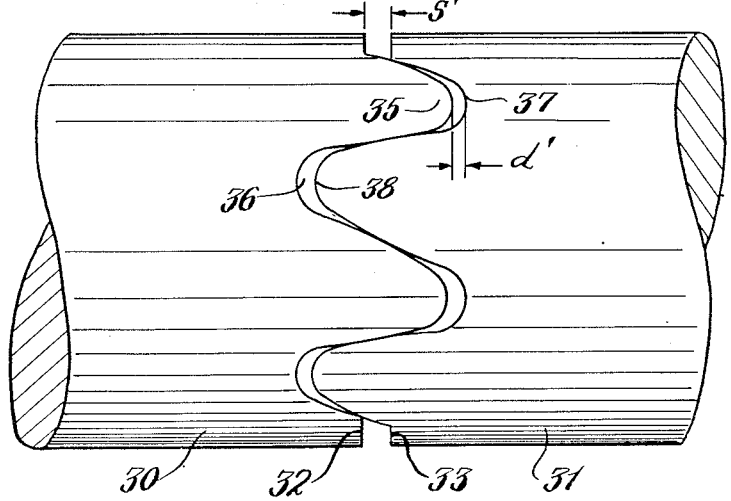
Figure 2 is a view similar to Figure 1 but showing an alternative preparation of the surfaces of the members for welding.

An alternative embodiment of the invention is shown in Figure 2. In this embodiment, a pair of members 30, 31 similar to the members 10, 11 is shown, which members have opposed surfaces 32, 33. However, in this embodiment of the invention, the surface 32 is provided with rows of chordally-extending, alternating projections 35 and apertures 36. Corresponding with each projection 35, the surface 33 has an aperture 37. Corresponding with each recess 36, the surface 33 has a boss or projection 38. These surfaces are shown in sinusoidal form. They may take any other form of cross-sectional shape. While stated as extending chordally, they may extend circumferentially. In a like manner to that shown in the first embodiment, the distance S' between the surfaces 32, 33 is preferably greater than the distance D' between the ends of the projections 35 and the base of the recess 37. In a like manner, a gas-exhaust passage not shown may also be provided. In this embodiment of the invention, heating by low-frequency or direct currents flowing longitudinally of the members will heat the points or lines of contact between the two members and it will be seen that this heat will be distributed fairly generally over the entire members 30, 31.

Thus, it will be seen that embodiments of the invention have been described which accomplish the objects of the invention heretofore stated and others, and that welded surfaces having an extended area may be effected easily and rapidly. Other forms the invention may take are complementary beveling of the surfaces with projections and recesses thereon to provide the limited area contact or the beveled surfaces may be made slightly spherical.

Obviously, other modifications and alterations will occur to others upon a reading and understanding of this specification. It is my intention to cover all such modifications and alterations insofar as they come within the scope of the appended claims.

Having thus described my invention, I claim:

1. In the art of butt welding, a pair of metallic members each having surfaces to be welded, one of the surfaces having an outwardly-tapering, frustro-conical projection and the other surface having an inwardly-tapering, frustro-conical recess adapted generally to mate with said projection, the angle of taper of said projection being slightly greater than the angle of taper of said recess, the maximum diameter of said projection being slightly greater than the maximum diameter of said recess whereby, when said projection and recess are mated, the pair of surfaces are at least slightly spaced.

2. The members of claim 1 wherein the length of said projection is greater than the depth of said recess by an amount less than the clearance between said surfaces when said projection is inserted in said recess.

3. The members of claim 1 wherein a passage communicates the base of said recess externally of said members.

4. The method of butt welding a pair of surfaces comprising forming, on one of said surfaces, an outwardly-tapering, frustro-conical projection and on the other of said pair of surfaces, an inwardly-tapering, frustro-conical recess adapted to generally mate with said projection, the angle of taper of said projection being slightly greater than the angle of taper of said recess and the maximum diameter of said projection being greater than the maximum diameter of said recess whereby, when said projection is inserted in said recess, said pair of surfaces are at least slightly spaced, inserting said projection in said recess and simultaneously inducing high-frequency electric currents to flow in the periphery of said surfaces and flowing low-frequency electric currents between the walls of said recess and the surfaces of said projection whereby heat is generated at spaced portions of said surfaces simultaneously.

5. The combination of claim 4 wherein the length of said projection is greater than the depth of said recess by a distance less than the spacing of said surfaces when said projection and recess are mated and the method comprises the additional step of advancing said surfaces into abutting engagement with the end of said projection engaging the base of said recess prior to the time when said surfaces come into engagement and fill the interior of said space created by the difference in the angles of the surfaces thereof.

FRANCIS S. DENNEEN.

REFERENCES CITED

The following references are of record in the file of this patent:

UNITED STATES PATENTS

| Number | Name | Date |
|---|---|---|
| 578,801 | Wilmot | Mar. 16, 1897 |
| 914,946 | Haldy | Mar. 9, 1909 |
| 1,022,712 | Thomson | Apr. 9, 1912 |
| 1,260,690 | Liady | Mar. 26, 1918 |
| 1,491,073 | Wells | Apr. 22, 1924 |
| 2,205,425 | Leonard | June 25, 1940 |